United States Patent
Hsieh et al.

(10) Patent No.: US 8,891,466 B2
(45) Date of Patent: Nov. 18, 2014

(54) METHOD OF HANDLING SOFT BUFFER FOR CARRIER AGGREGATION AND RELATED COMMUNICATION DEVICE

(75) Inventors: Chia-Wen Hsieh, New Taipei (TW); Chien-Min Lee, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 292 days.

(21) Appl. No.: 13/400,135

(22) Filed: Feb. 20, 2012

(65) Prior Publication Data

US 2012/0275397 A1 Nov. 1, 2012

Related U.S. Application Data

(60) Provisional application No. 61/480,843, filed on Apr. 29, 2011.

(51) Int. Cl.
*H04W 72/04* (2009.01)
*H04L 1/18* (2006.01)
*H04L 5/00* (2006.01)

(52) U.S. Cl.
CPC ............ *H04L 5/0044* (2013.01); *H04L 1/1822* (2013.01); *H04L 1/1812* (2013.01)
USPC ......................................................... 370/329

(58) Field of Classification Search
CPC .... H04L 1/1812; H04L 1/1822; H04L 5/0044
USPC .................................................. 370/328, 329
See application file for complete search history.

(56) References Cited

U.S. PATENT DOCUMENTS

| | | | | |
|---|---|---|---|---|
| 8,286,047 B2 * | 10/2012 | Che et al. | | 714/751 |
| 8,588,142 B2 * | 11/2013 | Seo et al. | | 370/328 |
| 8,724,742 B2 * | 5/2014 | Nimbalker et al. | | 375/316 |
| 2007/0189206 A1 * | 8/2007 | Chandra et al. | | 370/328 |
| 2012/0120889 A1 * | 5/2012 | Cheng et al. | | 370/329 |
| 2012/0188952 A1 * | 7/2012 | Baldemair et al. | | 370/329 |
| 2013/0176981 A1 * | 7/2013 | Earnshaw et al. | | 370/329 |

FOREIGN PATENT DOCUMENTS

JP 2005536159 A 11/2005

OTHER PUBLICATIONS

Qualcomm Incorporated, "R-110911 Soft buffer partitioning for CA," Jan. 21-25, 2011, 3GPP TSG-RAN WG1 #64.*

Qualcomm Incorporated, Soft buffer partitioning for CA, 3GPP TSG-RAN WG1 #63bis, R1-110331, Jan. 17-21, 2011, p. 1-6, Dublin, Ireland.

(Continued)

*Primary Examiner* — Mark Rinehart
*Assistant Examiner* — Kenneth P Hunt
(74) *Attorney, Agent, or Firm* — Winston Hsu; Scott Margo

(57) ABSTRACT

A method of handling a soft buffer of a mobile device in a wireless communication system is disclosed. The mobile device is configured a plurality of component carriers (CCs) by a network of the wireless communication system. The plurality of CCs comprise a primary CC (PCC) and at least one secondary CC (SCC). The method comprises determining a plurality of weightings corresponding to the plurality of CCs according to an indication; determining a plurality of sizes of a plurality of sub-blocks according to the plurality of weightings; and dividing the soft buffer into the plurality of sub-blocks according to the plurality of sizes of the plurality of sub-blocks, to arrange a plurality of hybrid automatic repeat request (HARQ) processes of the plurality of CCs in the plurality of sub-blocks.

48 Claims, 16 Drawing Sheets

(56) References Cited

OTHER PUBLICATIONS

Huawei, Hisilicon, "Soft buffer partitioning for Rel-10 downlink", 3GPP TSG RAN WG1 Meeting #64, R1-110898, Feb. 21-25, 2011, XP050490657, Taipei, p. 1-7.
NTT DOCOMO, "Soft Buffer Allocation for CA", 3GPP TSG RAN WG1 Meeting #64, R1-110860, Feb. 21-25, 2011, pp. 1-11, XP050490629, Taipei, Taiwan.
Ericsson, ST-Ericsson, "Views on soft buffer handling for Rel-10 UEs", 3GPP TSG RAN WG1 Meeting #63bis, R1-110033, Jan. 17-21, 2010, XP050490014, Dublin, Ireland, p. 1-4.
New Postcom, "Soft buffer size allocation for Rel-10 UEs", 3GPP TSG RAN WG1 Meeting #64, R1-110942, Feb. 21-25, 2011, XP 050490670, Taipei, Taiwan, p. 1-2.
3GPP TS 36.211 V10.0.0 (Dec. 2010) Technical Specification 3rd Generation Partnership Project; Technical Specification Group Radio Access Network; Evolved Universal Terrestrial Radio Access (E-UTRA); Physical channels and modulation (Release 10).
3GPP TS 36.212 V10.0.0 (Dec. 2010) Technical Specification 3rd Generation Partnership Project; Technical Specification Group Radio Access Network; Evolved Universal Terrestrial Radio Access (E-UTRA); Multiplexing and channel coding (Release 10).
3GPP TS 36.213 V10.0.0 (Dec. 2010) Technical Specification 3rd Generation Partnership Project; Technical Specification Group Radio Access Network; Evolved Universal Terrestrial Radio Access (E-UTRA); Physical layer procedures (Release 10).
3GPP TS 36.306 V10.0.0 (Dec. 2010) Technical Specification 3rd Generation Partnership Project; Technical Specification Group Radio Access Network; Evolved Universal Terrestrial Radio Access (E-UTRA); User Equipment (UE) radio access capabilities (Release 10).
3GPP TSG RAN WG1 Meeting #63bis R1-110240 Dublin, Ireland, Jan. 17-21, 2011 Source: NTT DOCOMO Title: Soft Buffer Partitioning and Rate Matching for Downlink CA Agenda Item: 6.2.1 Document for: Discussion and Decision.
TSG-RAN WG1 Meeting #63 Jacksonville, USA, Nov. 15-19, 2010. R1-106511. WF on Soft buffer size allocation for Rel-10 UE. Agenda item: 6.9 Document for: Discussion and decision.
3GPP TSG-RAN WG1 #64 R1-110911 Jan. 21-25, 2011 Taipei, Taiwan Agenda item: 6.2.1 Source: Qualcomm Incorporated Title: Soft buffer partitioning for CA Document for: Discussion and Decision.
3GPP TSG RAN WG1 Meeting #63 R1-105937 Jacksonville, USA, Nov. 15-19, 2010 Source: CATT Title: Soft buffer size allocation for Rel-10 UE Agenda Item: 6.9 Document for: Discussion and Decision.
3GPP TSG RAN WG1 Meeting #63 R1-106513 Jacksonville, USA, Nov. 15-19, 2010 Agenda Item: 6.9 Source: Huawei, HiSilicon Title: Soft buffer size allocation for Rel-10 downlink Document for: Discussion and decision.

* cited by examiner

| | Total number of soft channel bits ($N_{soft}$) | Maximum number of supported layers for spatial multiplexing in DL |
|---|---|---|
| Category 1 | 250368 | 1 |
| Category 2 | 1237248 | 2 |
| Category 3 | 1237248 | 2 |
| Category 4 | 1827072 | 2 |
| Category 5 | 3667200 | 4 |

FIG. 1

| Duplex mode | | Maximum number of HARQ ($M_{DL\_HARQ}$) |
|---|---|---|
| FDD | | 8 |
| TDD | UL/DL configuration 0 | 4 |
| | UL/DL configuration 1 | 7 |
| | UL/DL configuration 2 | 10 |
| | UL/DL configuration 3 | 9 |
| | UL/DL configuration 4 | 12 |
| | UL/DL configuration 5 | 15 |
| | UL/DL configuration 6 | 6 |

FIG. 2

| Ratio$_{PCC}$ | Weights w$_{PCC}$ for the PCC | | | |
|---|---|---|---|---|
| | N$_C$ = 2 | N$_C$ = 3 | N$_C$ = 4 | N$_C$ = 5 |
| Ratio$_{PCC} \leq \left\lfloor \dfrac{1}{N_C} \right\rfloor$ | r$_{1,1}$ | r$_{1,2}$ | r$_{1,3}$ | r$_{1,4}$ |
| $\left\lfloor \dfrac{1}{N_C} \right\rfloor <$ Ratio$_{PCC} \leq \left\lfloor \dfrac{2}{N_C} \right\rfloor$ | r$_{2,1}$ | r$_{2,2}$ | r$_{2,3}$ | r$_{2,4}$ |
| $\left\lfloor \dfrac{2}{N_C} \right\rfloor <$ Ratio$_{PCC} \leq \left\lfloor \dfrac{3}{N_C} \right\rfloor$ | NA | r$_{3,2}$ | r$_{3,3}$ | r$_{3,4}$ |
| $\left\lfloor \dfrac{3}{N_C} \right\rfloor <$ Ratio$_{PCC} \leq \left\lfloor \dfrac{4}{N_C} \right\rfloor$ | NA | NA | r$_{4,3}$ | r$_{4,4}$ |
| $\left\lfloor \dfrac{4}{N_C} \right\rfloor <$ Ratio$_{PCC} \leq \left\lfloor \dfrac{5}{N_C} \right\rfloor$ | NA | NA | NA | r$_{5,4}$ |

| $M_{overbooking}$ | Number of CCs | | | | |
|---|---|---|---|---|---|
| | 1 | 2 | 3 | 4 | 5 |
| | $f_1$ | $f_2$ | $f_3$ | $f_4$ | $f_5$ |

FIG. 12A

| UE Category | Number of CCs | | | | |
|---|---|---|---|---|---|
| | 1 | 2 | 3 | 4 | 5 |
| 1 | $f_{1,1}$ | $f_{1,2}$ | $f_{1,3}$ | $f_{1,4}$ | $f_{1,5}$ |
| 2 | $f_{2,1}$ | $f_{2,2}$ | $f_{2,3}$ | $f_{2,4}$ | $f_{2,5}$ |
| 3 | $f_{3,1}$ | $f_{3,2}$ | $f_{3,3}$ | $f_{3,4}$ | $f_{3,5}$ |
| 4 | $f_{4,1}$ | $f_{4,2}$ | $f_{4,3}$ | $f_{4,4}$ | $f_{4,5}$ |
| 5 | $f_{5,1}$ | $f_{5,2}$ | $f_{5,3}$ | $f_{5,4}$ | $f_{5,5}$ |
| 6 | $f_{6,1}$ | $f_{6,2}$ | $f_{6,3}$ | $f_{6,4}$ | $f_{6,5}$ |
| 7 | $f_{7,1}$ | $f_{7,2}$ | $f_{7,3}$ | $f_{7,4}$ | $f_{7,5}$ |
| 8 | $f_{8,1}$ | $f_{8,2}$ | $f_{8,3}$ | $f_{8,4}$ | $f_{8,5}$ |

| UE Category | Maximum number of layers supported by the UE | | | | | | | |
|---|---|---|---|---|---|---|---|---|
| | 1 | 2 | 3 | 4 | 5 | 6 | 7 | 8 |
| 1 | $f_{1,1}$ | $f_{1,2}$ | $f_{1,3}$ | $f_{1,4}$ | $f_{1,5}$ | $f_{1,6}$ | $f_{1,7}$ | $f_{1,8}$ |
| 2 | $f_{2,1}$ | $f_{2,2}$ | $f_{2,3}$ | $f_{2,4}$ | $f_{2,5}$ | $f_{2,6}$ | $f_{2,7}$ | $f_{2,8}$ |
| 3 | $f_{3,1}$ | $f_{3,2}$ | $f_{3,3}$ | $f_{3,4}$ | $f_{3,5}$ | $f_{3,6}$ | $f_{3,7}$ | $f_{3,8}$ |
| 4 | $f_{4,1}$ | $f_{4,2}$ | $f_{4,3}$ | $f_{4,4}$ | $f_{4,5}$ | $f_{4,6}$ | $f_{4,7}$ | $f_{4,8}$ |
| 5 | $f_{5,1}$ | $f_{5,2}$ | $f_{5,3}$ | $f_{5,4}$ | $f_{5,5}$ | $f_{5,6}$ | $f_{5,7}$ | $f_{5,8}$ |
| 6 | $f_{6,1}$ | $f_{6,2}$ | $f_{6,3}$ | $f_{6,4}$ | $f_{6,5}$ | $f_{6,6}$ | $f_{6,7}$ | $f_{6,8}$ |
| 7 | $f_{7,1}$ | $f_{7,2}$ | $f_{7,3}$ | $f_{7,4}$ | $f_{7,5}$ | $f_{7,6}$ | $f_{7,7}$ | $f_{7,8}$ |
| 8 | $f_{8,1}$ | $f_{8,2}$ | $f_{8,3}$ | $f_{8,4}$ | $f_{8,5}$ | $f_{8,6}$ | $f_{8,7}$ | $f_{8,8}$ |

METHOD OF HANDLING SOFT BUFFER FOR CARRIER AGGREGATION AND RELATED COMMUNICATION DEVICE

CROSS-REFERENCE TO RELATED APPLICATIONS

This application claims the benefit of U.S. Provisional Application No. 61/480,843, filed on Apr. 29, 2011 and entitled "Soft Buffer for Carrier Aggregated Systems", the contents of which are incorporated herein in their entirety.

BACKGROUND OF THE INVENTION

1. Field of the Invention

The present invention relates to a method used in a wireless communication system and related communication device, and more particularly, to a method of handling a soft buffer for carrier aggregation in a wireless communication system and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a radio network architecture that provides a high data rate, low latency, packet optimization, and improved system capacity and coverage. In the LTE system, a radio access network known as an evolved UTRAN (E-UTRAN) includes multiple evolved Node-Bs (eNBs) for communicating with multiple user equipments (UEs), and communicates with a core network including a mobility management entity (MME), a serving gateway, etc., for Non Access Stratum (NAS) control.

A LTE-advanced (LTE-A) system, as its name implies, is an evolution of the LTE system. The LTE-A system targets faster switching between power states, improves performance at coverage edge of an eNB. Besides, the LTE-A system includes advanced techniques, such as carrier aggregation (CA), coordinated multipoint transmission/reception (COMP), UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

The CA is introduced to the LTE-A system by which more than one component carriers (CCs) are aggregated to achieve a wider-band transmission. Accordingly, the LTE-A system can support a wider bandwidth up to 100 MHz by aggregating a maximum number of 5 CCs, where a maximum bandwidth of each CC is 20 MHz and is backward compatible with the 3GPP Rel-8 standard. The LTE-A system supports the CA for both contiguous and non-contiguous CCs, wherein each CC limited to a maximum of 110 resource blocks. The CA increases bandwidth flexibility by aggregating the CCs.

When a UE is configured with the CA, the UE has the ability to receive and/or transmit packets on one or multiple CCs to increase throughput. In the LTE-A system, it is possible that an eNB configures the UE different numbers of uplink (UL) and downlink (DL) CCs. Moreover, the CCs configured to the UE necessarily consists of one DL primary CC (PCC) and one UL PCC. The most important feature of the DL PCC and the UL PCC is exchanging control information between the UE and the eNB. CCs other than the PCCs are named UL or DL secondary CCs (SCCs). Numbers of the UL and DL SCCs are arbitrary, and are related to UL and DL aggregation capabilities of the UE and available radio resources.

A hybrid automatic repeat request (HARQ) process is used in the LTE system to provide both efficient and reliable communications. Different from an ARQ process, a forward correcting code (FEC) is used for the HARQ process. For example, a receiver feeds back an acknowledgment (ACK) to inform a transmitter that a packet has been received correctly if the receiver decodes the packet correctly. Oppositely, the receiver feeds back a negative acknowledgment (NACK) to the transmitter if the receiver cannot decode the packet correctly. In this situation, the UE stores part or the whole of the packet in a soft buffer of the UE. After the UE receives a retransmitted packet from the transmitter, soft values of the retransmitted packet and the stored packet are combined. The receiver decodes the packet by using the combined soft values. Furthermore, the combination of the previously erroneously received packet (s) and the currently received packet increases a probability of successful decoding. The UE continues the HARQ process until the packet is decoded correctly, or until a maximum number of retransmissions have been sent, at which time the HARQ process declares a failure and leaves it up to the ARQ process in radio link control (RLC) for trying again. In other words, space of the soft buffer should be reserved for the HARQ process such that the UE can store the HARQ process which has not been decoded correctly. Otherwise, the UE blocks the HARQ process if the soft buffer is fully occupied. When multiple packets are transmitted to the UE, the UE may need to store multiple HARQ processes due to unsuccessful decoding of the packets.

In detail, the UE can store up to 8 HARQ processes in the soft buffer in the LTE system (i.e., single CC system). A transport block (TB) is a physical interface between an eNB and a UE, and corresponds to the data carried in a LTE radio subframe. Further, each LTE radio subframe is 1 millisecond (ms), and each LTE radio frame is 10 ms, which consists of 10 LTE radio subframes. When using the MIMO (e.g. spatial multiplexing), more than one transport blocks can be transmitted per transmission time interval (TTI) for the UE.

A soft buffer partition rule in the LTE system (i.e., single CC system) is introduced as follows. The total number of soft channel bits, $N_{soft}$, depends on UE category of the UE, as shown in a table 10 of FIG. 1, wherein various values of $N_{soft}$ are listed according to an example of the prior art. $N_{soft}$ can be divided into multiple partitions according to the following equation:

$$N_{IR} = \left\lfloor \frac{N_{soft}}{K_{MIMO} \cdot \min(M_{DL\_HARQ}, M_{limit})} \right\rfloor, \qquad \text{(Eq. 1)}$$

wherein $N_{IR}$ is a size of a partition which is used for storing a transport block. $N_{soft}$ is the total number of soft channel bits of the UE. $K_{MIMO}$ is a number of transport blocks that may be transmitted to the UE in a TTI, and is related to the MIMO used by the UE and the network. In general, if the spatial multiplexing with n spatial streams is configured to the UE, $K_{MIMO}$ is set to n. $M_{limit}$ is a positive value which equals to 8. $M_{DL\_HARQ}$ is a maximum number of DL HARQ processes per serving cell, and corresponds to a duplex mode and its configuration. For example, $M_{DL\_HARQ}$ is set to 8 for frequency-division duplexing (FDD). Values 4, 7, 10, 9, 12, 15 and 6 are used for time-division duplexing (TDD) UL/DL configuration 0, 1, 2, 3, 4, 5 and 6, respectively, as shown in a table 20 of FIG. 2, wherein various values of $M_{DL\_HARQ}$ are listed according to an example of the prior art. min(x,y) returns the smaller one of x and y.

As shown in the equation Eq.1, up to min ($M_{DL\_HARQ}$, $M_{limit}$) HARQ processes can be stored in the soft buffer. If the spatial multiplexing with $K_{MIMO}$ spatial streams is configured to the UE, each HARQ process consists of $K_{MIMO}$ transport blocks. Therefore, the entire soft buffer is divided into $K_{MIMO}$ min ($M_{DL\_HARQ}$,$M_{limit}$) partitions. Each partition consists of $N_{IR}$ soft channel bits which can be used for storing one transport block.

Please refer to FIG. 3, which is a schematic diagram of a soft buffer SBp according to the prior art. In this example, the spatial multiplexing is not configured to the UE (i.e., $K_{MIMO}$=1), the soft buffer SBp is divided into 8 partitions P301-P308 for storing 8 HARQ processes while $M_{DL\_HARQ}$ is equal to or larger than 8. $N_{soft}$ is a size (e.g. number of bits) of the soft buffer SBp, and depends on UE category of the UE. $N_{IR}$ is a number of bits of a partition of the soft buffer SBp. Therefore, a transport block with a maximum size $N_{IR}$ can be stored in a corresponding partition, and at most 8 HARQ processes can be stored in the soft buffer SBp.

However, the UE may need to store more than 8 HARQ processes in the soft buffer in the LTE-A system when multiple CCs are configured to the UE. For example, when the UE is configured with 5 DL CCs and operates in FDD duplex mode, the UE may need to store up to 40 HARQ processes due to unsuccessful decoding of the packets. There are two possible solutions in the LTE-A system with multiple CCs, which are introduced as follows. In the first solution, the soft buffer partition rule is the same as that for the LTE system (i.e., the single CC system). In other words, up to 8 HARQ processes can be stored in the soft buffer. All the erroneous HARQ processes can share the soft buffer statistically. Thus, a blocking probability of a HARQ process increases, and the system throughput is diminished. In the second solution, the soft buffer can be simply divided into 40 partitions for storing up to 40 HARQ processes, a size of each partition of the soft buffer is reduced. For each erroneous HARQ process, the number of soft channel bits that UE can store is reduced according to the size reduction of a corresponding partition. As a result, the coding performance is reduced and more retransmissions are required, and the system throughput is diminished. Obviously, neither the first nor the second solution can achieve optimal system throughput. Therefore, when the CA is configured to the UE, how to handle a soft buffer of a UE for storing HARQ processes is a topic to be discussed and addressed.

SUMMARY OF THE INVENTION

The present invention therefore provides a method and related communication device for handling a soft buffer for carrier aggregation in a wireless communication system to solve the abovementioned problems.

A method of handling a soft buffer of a mobile device in a wireless communication system is disclosed. The mobile device is configured a plurality of component carriers (CCs) by a network of the wireless communication system. The plurality of CCs comprise a primary CC (PCC) and at least one secondary CC (SCC). The method comprises determining a plurality of weightings corresponding to the plurality of CCs according to an indication; determining a plurality of sizes of a plurality of sub-blocks according to the plurality of weightings; and dividing the soft buffer into the plurality of sub-blocks according to the plurality of sizes of the plurality of sub-blocks, to arrange a plurality of hybrid automatic repeat request (HARQ) processes of the plurality of CCs in the plurality of sub-blocks.

A method of handling a soft buffer of a mobile device in a wireless communication system is disclosed. The mobile device is configured a plurality of component carriers (CCs) by a network of the wireless communication system. The method comprises dividing at least one sub-block of the soft buffer into a plurality of partitions, wherein a number of the plurality of partitions is determined according to an indication; and arranging a plurality of hybrid automatic repeat request (HARQ) processes of the plurality of CCs in the plurality of partitions.

A method of handling a soft buffer of a mobile device in a wireless communication system for a network of the wireless communication system is disclosed. The mobile device is configured a plurality of component carriers (CCs) by the network. The plurality of CCs comprise a primary CC (PCC) and at least one secondary CC (SCC). The method comprises determining a plurality of weightings corresponding to the plurality of CCs according to an indication; and determining a plurality of sizes of a plurality of sub-blocks according to the plurality of weightings, for dividing the soft buffer into the plurality of sub-blocks according to the plurality of sizes.

A method of handling a soft buffer of a mobile device in a wireless communication system for a network of the wireless communication system is disclosed. The mobile device is configured a plurality of component carriers (CCs) by the network. The method comprises determining a number of a plurality of partitions according to an indication; and dividing at least one sub-block of the soft buffer into the plurality of partitions according to the number of the plurality of partitions.

A mobile device of a wireless communication system for handling a soft buffer of the mobile device is disclosed. The mobile device is configured a plurality of component carriers (CCs) by a network of the wireless communication system. The plurality of CCs comprise a primary CC (PCC) and at least one secondary CC (SCC). The method comprises means for determining a plurality of weightings corresponding to the plurality of CCs according to an indication; means for determining a plurality of sizes of a plurality of sub-blocks according to the plurality of weightings; and means for dividing the soft buffer into the plurality of sub-blocks according to the plurality of sizes of the plurality of sub-blocks, to arrange a plurality of hybrid automatic repeat request (HARQ) processes of the plurality of CCs in the plurality of sub-blocks.

A mobile device of a wireless communication system for handling a soft buffer of the mobile device is disclosed. The mobile device is configured a plurality of component carriers (CCs) by a network of the wireless communication system. The method comprises means for dividing at least one sub-block of the soft buffer into a plurality of partitions, wherein a number of the plurality of partitions is determined according to an indication; and means for arranging a plurality of hybrid automatic repeat request (HARQ) processes of the plurality of CCs in the plurality of partitions.

A network of a wireless communication system for handling a soft buffer of a mobile device in the wireless communication system is disclosed. The mobile device is configured a plurality of component carriers (CCs) by the network. The plurality of CCs comprise a primary CC (PCC) and at least one secondary CC (SCC). The method comprises means for determining a plurality of weightings corresponding to the plurality of CCs according to an indication; and means for determining a plurality of sizes of a plurality of sub-blocks according to the plurality of weightings, for dividing the soft buffer into the plurality of sub-blocks according to the plurality of sizes.

A network of a wireless communication system for handling a soft buffer of a mobile device in the wireless communication system is disclosed. The mobile device is configured a plurality of component carriers (CCs) by the network. The method comprises means for determining a number of a plurality of partitions according to an indication; and means for dividing at least one sub-block of the soft buffer into the plurality of partitions according to the number of the plurality of partitions.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table of numbers of soft channel bits $N_{soft}$ according to an example of the prior art.

FIG. 2 is a table of maximum numbers of DL HARQ processes $M_{DL\_HARQ}$ according to an example of the prior art.

FIG. 9 is a table of weightings $w_{PCC}$ according to an example of the present invention.

FIGS. 12A-12C are tables of weightings $M_{overbooking}$ according to an example of the present invention.

DETAILED DESCRIPTION

Figure 3:
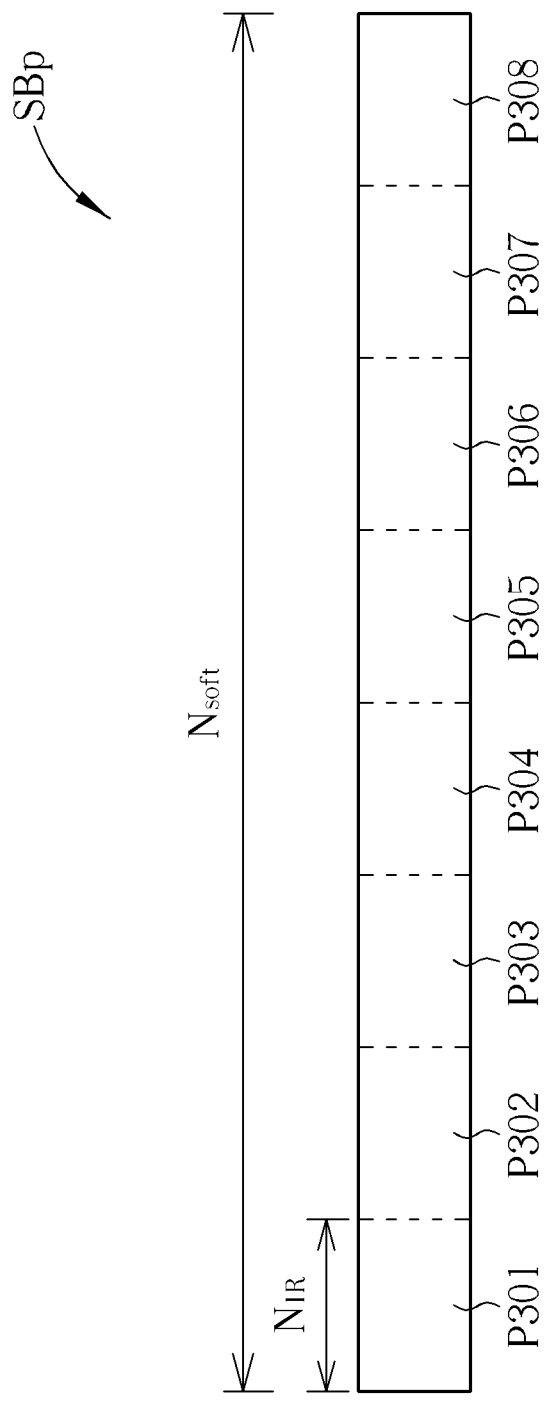
FIG. 3 is a schematic diagram of a soft buffer according to an example of the prior art.
Figure 4:
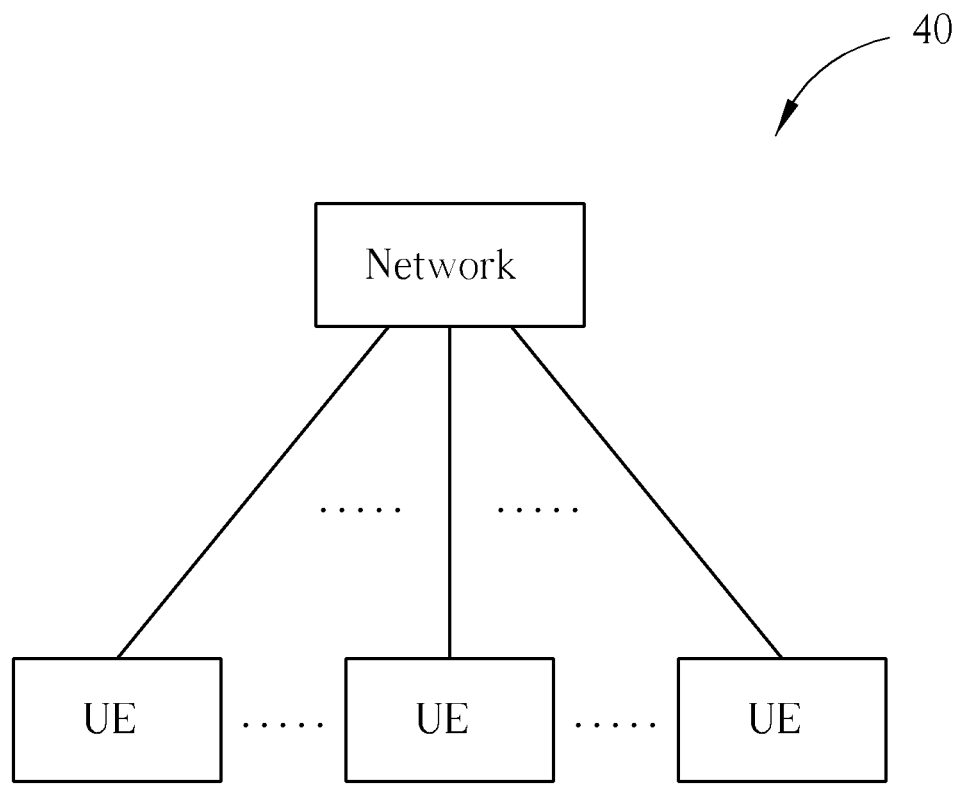
FIG. 4 is a schematic diagram of a wireless communication system according to an example the present invention.

Please refer to FIG. 4, which is a schematic diagram of a wireless communication system 40 according to an example of the present invention. The wireless communication system 40, such as a long term evolution-advanced (LTE-A) system or other mobile communication systems supporting carrier aggregation (CA) (e.g. multiple component carriers (CCs)), is briefly composed of a network and a plurality of user equipments (UEs). In FIG. 4, the network and the UEs are simply utilized for illustrating the structure of the wireless communication system 40. Practically, the network can be referred to as an evolved universal terrestrial radio access network (E-UTRAN) comprising a plurality of evolved Node-Bs (eNBs) and relays in the LTE-A system. The UEs can be mobile devices such as mobile phones, laptops, tablet computers, electronic books, and portable computer systems. Besides, the network and a UE can be seen as a transmitter or a receiver according to transmission direction, e.g., for an uplink (UL), the UE is the transmitter and the network is the receiver, and for a downlink (DL), the network is the transmitter and the UE is the receiver.

Figure 5:
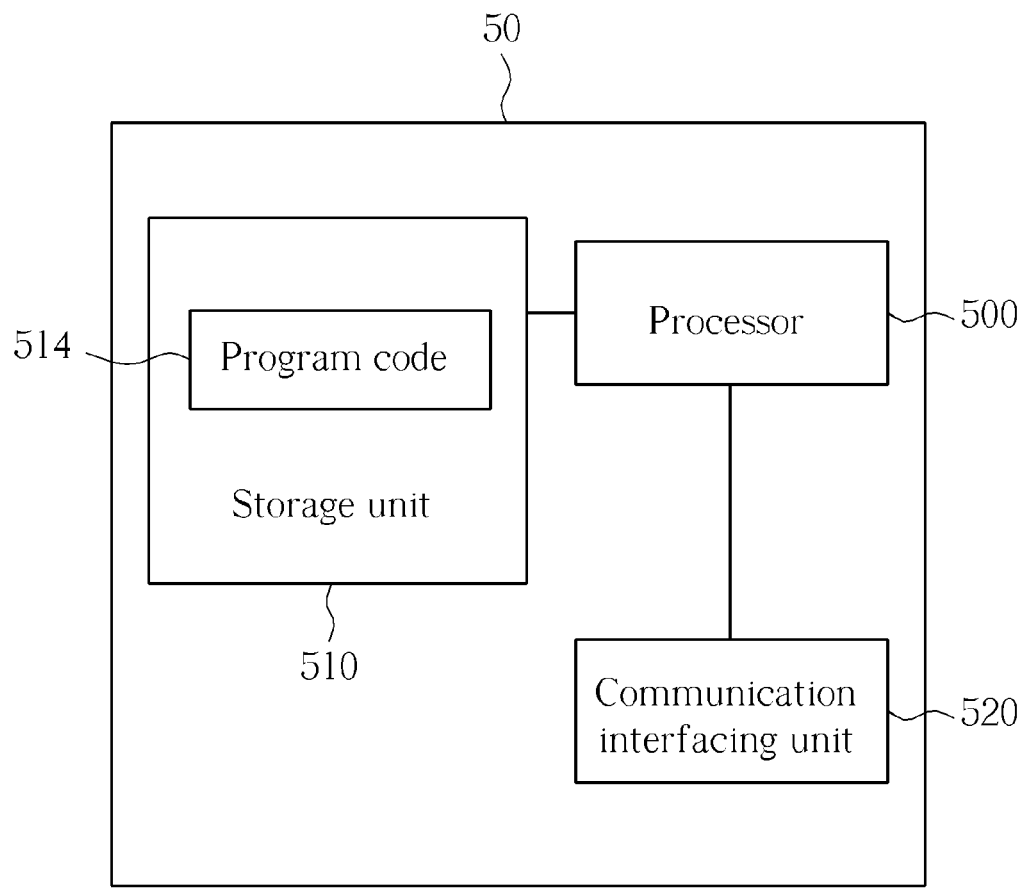
FIG. 5 is a schematic diagram of a communication device according to an example to the present invention.

Please refer to FIG. 5, which is a schematic diagram of a communication device 50 according to an example of the present invention. The communication device 50 can be a UE or the network shown in FIG. 4, but is not limited herein. The communication device 50 may include a processor 500 such as a microprocessor or an Application Specific Integrated Circuit (ASIC), a storage unit 510 and a communication interfacing unit 520. The storage unit 510 may be any data storage device that can store a program code 514, accessed by the processor 500. Examples of the storage unit 510 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 520 is preferably a radio transceiver and can exchange wireless signals with the network according to processing results of the processor 500.

Figure 6:
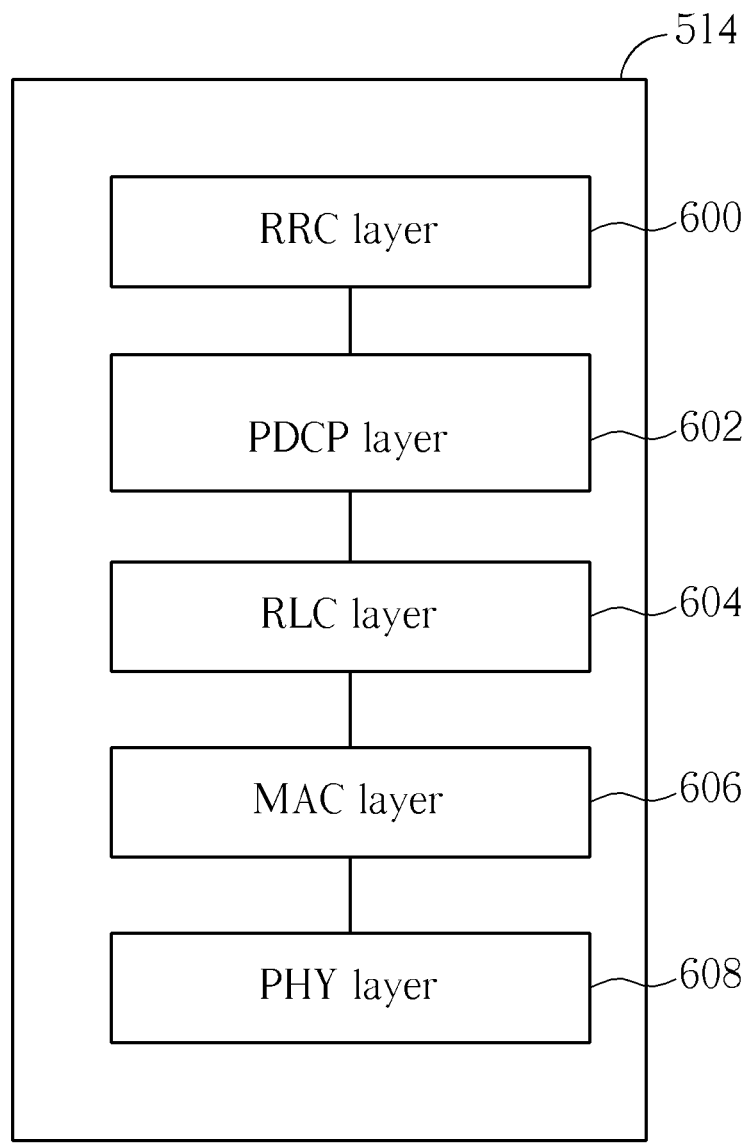
FIG. 6 is a schematic diagram of communication protocol layers for a wireless communication system.

Please refer to FIG. 6, which illustrates a schematic diagram of communication protocol layers for the wireless communication system 40. Behaviors of some of the communication protocol layers may be defined in the program code 514 and executed by the processor 500. The communication protocol layers from top to bottom are a radio resource control (RRC) layer 600, a packet data convergence protocol (PDCP) layer 602, a radio link control (RLC) layer 604, a media access control (MAC) layer 606 and a physical (PHY) layer 608. The RRC layer 600 is used for performing broadcast, paging, RRC connection management, measurement reporting and control and radio bearer control generating or releasing radio bearers. The PDCP layer 602 is used for ciphering and integrity protection of transmissions, and maintaining delivery order during a handover. The RLC layer 604 is used for segmentation/concatenation of packets and maintaining delivery sequence when packet loses. The MAC layer 606 is responsible for a hybrid automatic repeat request (HARQ) process, multiplexing logical channels, a random access procedure and maintaining a UL timing alignment. In each HARQ process, an acknowledgement (ACK) is reported if the MAC data/control packet is received and decoded successfully. Otherwise, a negative acknowledgement (NACK) is reported. The PHY layer 608 is used to provide physical channels to the UEs and the network (e.g. eNB and/or relay). FIG. 6 simply illustrates the behaviors of the communication protocol layers conceptually, and detail of the behaviors may be different for the LTE-A system and other communication systems.

Figure 7:
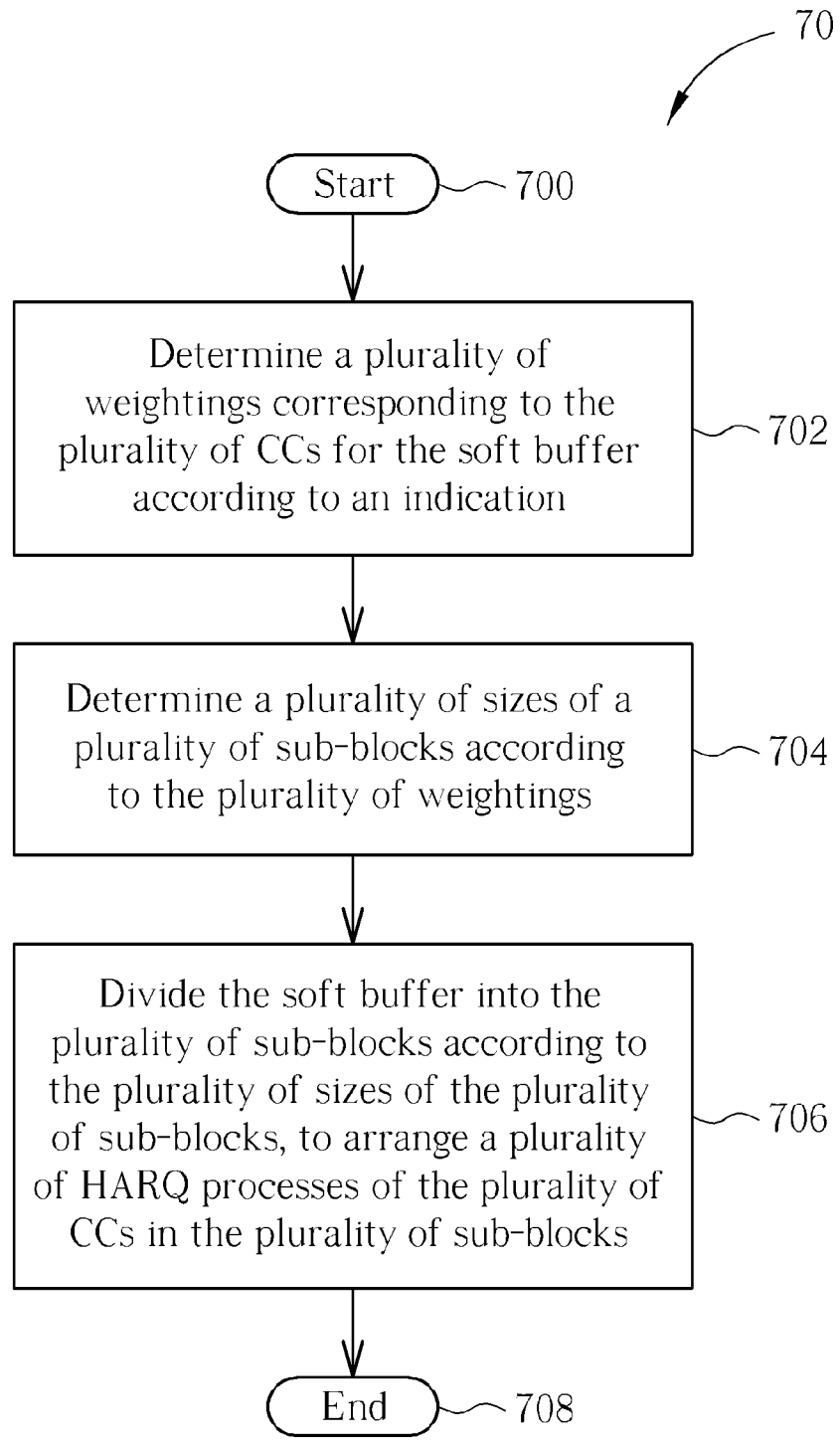
FIG. 7 is a flowchart of a process according to an example of the present invention.

Please refer to FIG. 7, which is a flowchart of a process 70 according to an example of the present invention. The process 70 is utilized in a UE and the network shown in FIG. 4, for handling a soft buffer of the UE. The UE is configured a plurality of CCs by the network, and the plurality of CCs includes a primary CC (PCC) and at least one secondary CC (SCC). The process 70 maybe compiled into the program code 514 and includes the following steps:

Step 700: Start.

Step 702: Determine a plurality of weightings corresponding to the plurality of CCs for the soft buffer according to an indication.

Step 704: Determine a plurality of sizes of a plurality of sub-blocks according to the plurality of weightings.

Step 706: Divide the soft buffer into the plurality of sub-blocks according to the plurality of sizes of the plurality of sub-blocks, to arrange a plurality of HARQ processes of the plurality of CCs in the plurality of sub-blocks.

Step 708: End.

According to the process 70, the UE determines the plurality of weightings corresponding to the plurality of CCs for the soft buffer according to the indication. Then, the UE determines the plurality of sizes of the plurality of sub-blocks according to the plurality of weightings. Thus, the UE can divide the soft buffer into the plurality of sub-blocks according to the plurality of sizes of the plurality of sub-blocks, to arrange the plurality of HARQ processes of the plurality of CCs in the plurality of sub-blocks. In other words, the UE arranges (e.g. stores) the plurality of HARQ processes of the PCC and the at least one SCC in sub-blocks with various sizes (and thus in partitions with various sizes). For example, the HARQ processes of the PCC can be arranged in sub-blocks with larger sizes (e.g. by using a large weighting) since packets transmitted on the PCC are more important (e.g. including control information) and a number of the packets (i.e., traffic load) is large. The HARQ processes of the at least one SCC can be arranged in sub-blocks with smaller sizes (e.g. by using at least one small weighting) since packets transmitted on the SCC are less important and a number of the packets is small. That is, the soft buffer is utilized efficiently and flexibly. As a result, blocking probabilities of the HARQ processes of both the PCC and the at least one SCC are reduced, and data transmitted on the PCC can be recovered and executed rapidly. Therefore, system throughput is increased, and the UE can operate regularly without an interrupt or a delay.

Please note that, a spirit of the process 70 is that the UE arranges the HARQ processes of the PCC and the at least one SCC in sub-blocks with various sizes (and thus in partitions with various sizes) in the soft buffer such that the soft buffer is utilized efficiently and flexibly. Factors according to which the UE determines the plurality of weightings are not limited. Methods based on which the UE divides the soft buffer and arranges the HARQ processes are also not limited.

In general, a soft buffer partition rule for the wireless communication system 40 configured with CA is introduced as follows. First, the total number of soft channel bits (i.e., a size of the soft buffer) of a UE, $N_{soft}$, is divided into $N_C$ sub-blocks for $N_C$ configured CCs according to an arbitrary partition rule (e.g. $N_{soft}$ is equally divided for all the configured CCs). A tentative size of a sub-block in terms of soft channel bits for the $n_c$-th CC is defined as $N'_{soft}(n_c)$, wherein $1 \leq n_c \leq N_c$ and $$\sum_{n_c=1}^{N_C} N'_{soft}(n_c) = N_{soft}.$$

Then, the UE determines a plurality of weightings corresponding to the plurality of CCs according to an indication, and divides the soft buffer into a plurality of sub-blocks according to the plurality of weightings, as follows $$N_{soft}(n_c) = \lfloor w(n_c) \cdot N'_{soft}(n_c) \rfloor, \quad \text{(Eq. 2)}$$

wherein $\sum_{n_c=1}^{N_C} N_{soft}(n_c) = N_{soft}.$ $w(n_c)$ is the weighting for the $n_c$-th CC according to the indication, and is a positive value larger than zero. Note that the weighting of the PCC can be set equal to or greater than the weightings of SCCs. $N_{soft}(n_c)$ is the size of the sub-block in terms of soft channel bits for the $n_c$-th CC, and is determined according to the weighting $w(n_c)$ and the tentative size $N'_{soft}(n_c)$. After the UE determines the size of the soft buffer for each configured CC, a size of a partition for a transport block of each configured CC can be determined as follows:

$$N_{IR}(n_c) = \left\lfloor \frac{N_{soft}(n_c)}{K_{MIMO} \cdot \min(M_{DL\_HARQ}(n_c), M_{limit})} \right\rfloor, \quad \text{(Eq. 3)}$$

wherein $N_{IR}(n_c)$ is the size of the partition for the transport block of the $n_c$-th CC. $N_{soft}(n_c)$ is the size of sub-block in terms of soft channel bits for the $n_c$-th CC. $K_{MIMO}$ is a number of transport blocks that may be transmitted to the UE in one TTI per CC, and is related to the MIMO used by the UE and the network. $M_{limit}$ is a positive value. $M_{DL\_HARQ}(n_c)$ is a maximum number of DL HARQ processes of the $n_c$-th CC, and corresponds to a duplex mode and its configuration.

Figure 8:
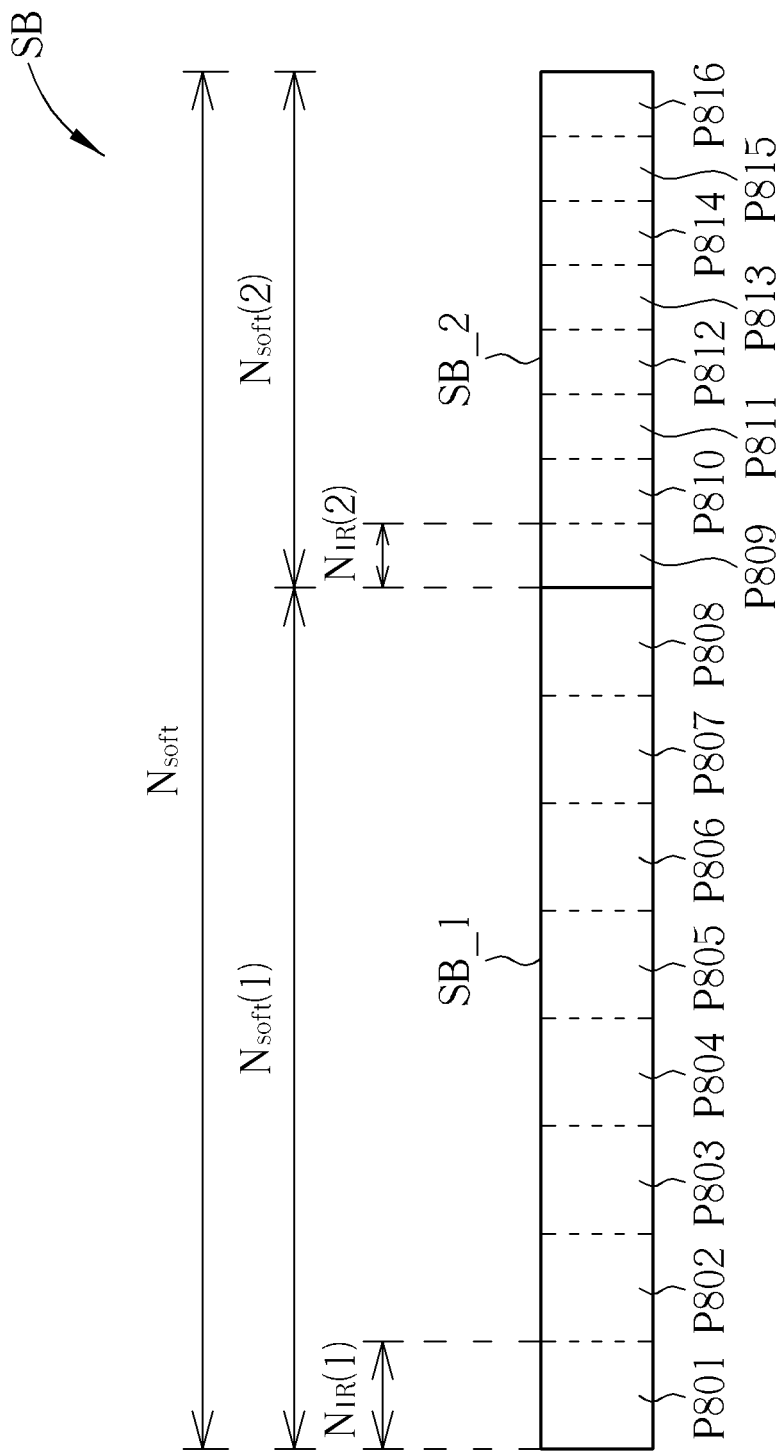
FIG. 8 is a schematic diagram of a soft buffer according to an example of the present invention.

For example, please refer to FIG. 8, which is a schematic diagram of a soft buffer SB according an example of the present invention. The UE is configured 2 CCs by the network and operates in a FDD mode, wherein one of the two CCs is a PCC and the other one is a SCC. Since only one transport block may be transmitted to the UE in one TTI (i.e., the spatial multiplexing is not enabled), the UE divides the soft buffer SB into two sub-blocks SB_1 and SB_2 for the configured CCs, respectively, according to the present invention, such that at most 8 HARQ processes can be stored in each sub-block. Thus, the UE can arrange HARQ processes of the two CCs in the sub-blocks SB_1 and SB_2, wherein each HARQ process is arranged to a corresponding partition. In detail, a size (e.g. number of soft channel bits) of the soft buffer SB is $N_{soft}$. Sizes of the sub-blocks SB_1 and SB_2 which are $N_{soft}(1)$ and $N_{soft}(2)$, respectively, are the same, i.e., $N'_{soft}(1)=N'_{soft}(2)=N_{soft}/2$. The sub-blocks SB_1 and SB_2 are used for the HARQ processes of the PCC and the SCC, respectively. Then, the sizes of the sub-blocks SB_1 and SB_2 are modified by using weightings $w(1)=w_{PCC}$ and $w(2)=(2-w_{PCC})$, respectively, as follows: $N_{soft}(1)=N'_{soft}(1) \cdot w(1)$ and $N_{soft}(2)=N'_{soft}(2) \cdot w(2)$, wherein $1 \leq w_{PCC} \leq 2$, such that $N_{soft}(1)$ is equal or larger than $N_{soft}(2)$.

Further, as shown in FIG. 8, the sub-block SB_1 is divided into 8 partitions P801-P808, and the sub-block SB_2 is divided into 8 partitions P809-P816. The UE can determine partition sizes $N_{IR}(1)$ and $N_{IR}(2)$ for the transport blocks of the configured CCs, respectively, according to the equation Eq.3. That is, a size of each of the partitions P801-P808 is $N_{IR}(1)$, and a size of each of the partitions P809-P816 is $N_{IR}(2)$. Therefore, the HARQ processes of the PCC which are more important can be arranged in the 8 partitions with a large size $N_{IR}(1)$. At the same time, the HARQ processes of the SCC which are less important can also be arranged in the 8 partitions with a small size $N_{IR}(2)$. Please note that, the above example illustrates a case wherein the soft buffer is first equally divided into sub-blocks with the same size (i.e., $N'_{soft}(n_1)=N'_{soft}(n_2)$, wherein $n_1 \neq n_2$ are indices of CCs) before applying weightings to the sub-blocks. However, the soft buffer can also be first divided into sub-blocks with various sizes, i.e., $N'_{soft}(n_c)$ for the $n_c$-th CC is arbitrary. Then, a weighting $w(n_c)$ is applied to the sub-block corresponding to the $n_c$-th CC to obtain a size $N_{soft}(n_c)$ by using $N_{soft}(n_c)=N'_{soft}(n_c) \cdot w(n_c)$. As a result, blocking probabilities of the HARQ processes of both the PCC and the SCC are not increased. Control information and data transmitted on the PCC are recovered rapidly, since the HARQ processes with the large size (i.e., better coding performance) can be stored in the soft buffer. System throughput is increased efficiently by using the CA without being affected by inefficient use of the soft buffer.

Please note that, factors according to which a weighting for a PCC is determined are not limited. For example, please refer to FIG. 9, which is a table 90 of weightings $w_{PCC}$ according to an example of the present invention. The table 90 is preferably is stored in the UE. In the table 90, a weighting $w_{PCC}$ is determined according to a parameter $Ratio_{PCC}$ and a number of CCs $N_C$, wherein $\lfloor x \rfloor$ is the largest integer not greater than x. In other words, the weighting $w_{PCC}$ is indicated by the parameter Ratio and the number of CCs $N_C$. In detail, an indication is generated by the UE according to the parameter $Ratio_{PCC}$ and the number of CCs $N_C$. Alternatively, the indication is generated by the network according to the parameter $Ratio_{PCC}$ and the number of CCs $N_C$, and the indication is then transmitted by the network to the UE. Further, the indication can also be generated by both the UE and the network according to the parameter $Ratio_{PCC}$ and the number of CCs $N_c$ (i.e., the same rule). The parameter $Ratio_{PCC}$ is represented as follows:

$$Ratio_{PCC} = \left\lfloor \frac{BW(PCC)}{\sum_{n_c=1}^{N_c} BW(n_c)} \right\rfloor, 0 < Ratio_{PCC} \leq 1, \quad (Eq. 4)$$

wherein BW(PCC) and BW($n_c$) are bandwidths of the PCC and the $n_c$-th CC, respectively, and $r_{ij}$, $1 \leq i \leq 5$, $1 \leq j \leq 4$ are positive values. After the weighting $w_{PCC}$ for the PCC is determined, a weighting for the n-th SCC $w(n_c)$ can be determined as follows $w(n_c)=(N_C-w_{PCC})/(N_C-1)$, wherein $n_c \in$ indices of the SCCs. Therefore, sizes of the partitions for each CC can be modified or adjusted accordingly.

Please note that, an indication (and thus weightings) can be generated according to various factors, such as design considerations or system requirements. For example, the indication (and thus the weightings) can be determined according to a combination of priorities of CCs configured to the UE, UE category of the UE, a number of NACKs transmitted by the UE, an average number of HARQ processes of the UE, traffic load of the UE, a number of the CCs configured to the UE, bandwidths of the CCs configured to the UE and a maximum number of layers supported by the UE, and is not limited herein. That is, the indication (and thus the weighting $M_{overbooking}$) is generated (e.g. by the UE or the network) according to the combination of the abovementioned parameters and variables. Besides, the indication (and thus the weightings) mentioned above can be generated by the UE itself. Alternatively, the indication is generated by a network, and is transmitted by the network to the UE via a signaling (e.g. radio resource control (RRC) signaling). Furthermore, the indication can be generated by both the UE and the network according to the same rule, to reducing overhead of the signaling. On the other hand, a time at which a soft buffer is divided into multiple partitions for multiple CCs is not limited. For example, the soft buffer can be divided after a PCC of the CCs is reconfigured, i.e., an indication capable of determining the weightings is generated after the PCC is reconfigured. Alternatively, the soft buffer can be divided after a number of the CCs is changed, i.e., an indication capable of determining the weightings is generated after the number of the CCs is changed. Further, the CCs mentioned in the above examples are preferably referred to as DL CCs, since HARQ processes stored in the UE are corresponding to packets transmitted on DL.

Besides, the process 70 and examples mentioned above can be realized in the network. For example, the network can determine weightings according to an indication, and transmit the weightings to a UE such that the UE can determine sizes of sub-blocks according to the weightings. Alternatively, the network may further determine the sizes of the sub-blocks according to the weightings, and transmits the sizes to the UE such that the UE can divide the soft buffer into the sub-blocks according to the sizes of the sub-blocks. Furthermore, the network may not need to transmit the weightings nor the sizes of the sub-blocks to the UE since the same indication is also generated by the UE according to the same rule. Thus, the UE can determine the weightings, and determine the sizes of the sub-blocks according to the weightings, for dividing the soft buffer into the sub-blocks according to the sizes of the sub-blocks.

Figure 10:
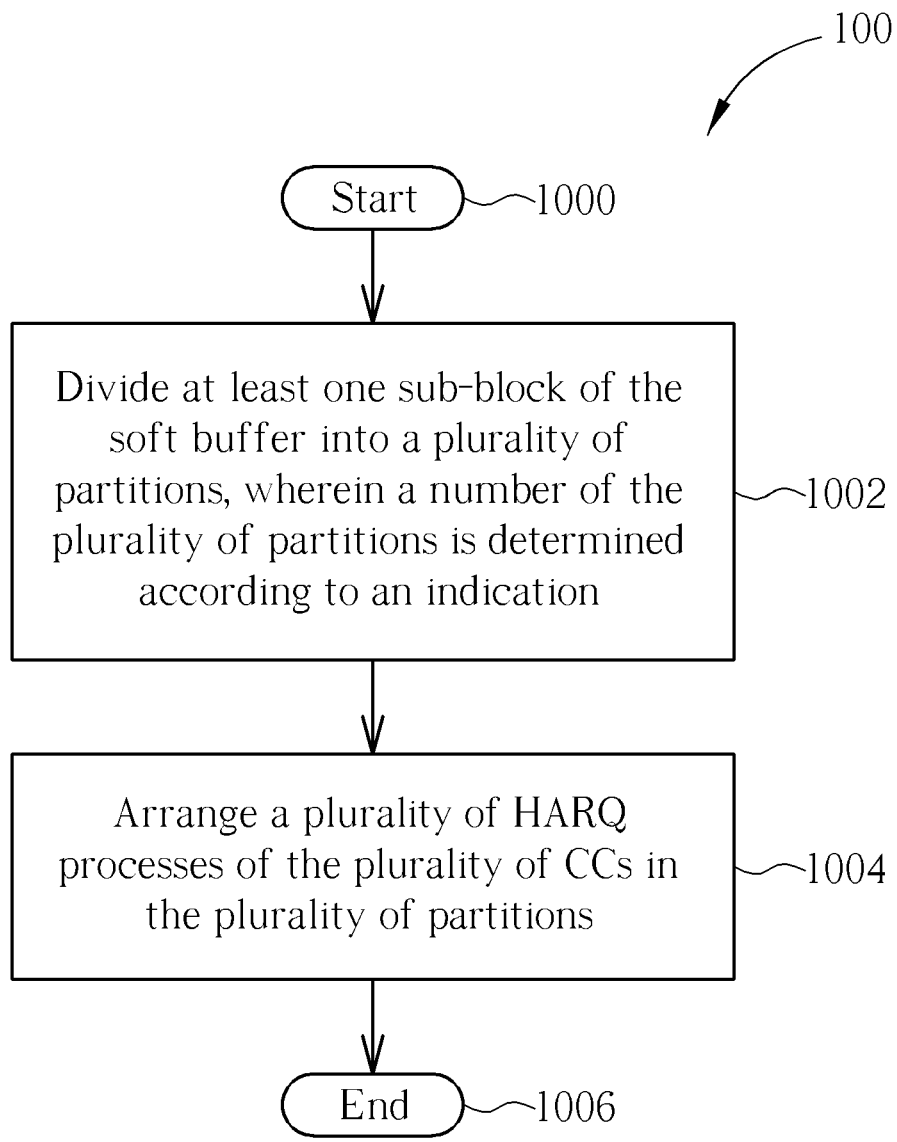
FIG. 10 is a flowchart of a process according to an example of the present invention.

Please refer to FIG. 10, which is a flowchart of a process 100 according to an example of the present invention. The process 100 is utilized in a UE and the network shown in FIG. 4, for handling a soft buffer of the UE. The UE is configured a plurality of CCs by the network, and the plurality of CCs includes a primary CC (PCC) and at least one secondary CC (SCC). The process 100 may be compiled into the program code 514 and includes the following steps:

Step 1000: Start.

Step 1002: Divide at least one sub-block of the soft buffer into a plurality of partitions, wherein a number of the plurality of partitions is determined according to an indication.

Step 1004: Arrange a plurality of HARQ processes of the plurality of CCs in the plurality of partitions.

Step 1006: End.

According to the process 100, the UE divides the at least one sub-block of the soft buffer into the plurality of partitions, wherein the number of the plurality of partitions is determined according to the indication. Then, the UE arranges the plurality of HARQ processes of the plurality of CCs in the plurality of partitions. In other words, the UE divides one or more sub-blocks of the soft buffer into various numbers of partitions, to arrange (e.g. stores) the plurality of HARQ processes of the plurality of CCs in the partitions. For example, the UE can divide the soft buffer into more partitions for arranging more HARQ processes with a small size in the partitions, to reduce blocking probabilities of the HARQ processes. Alternatively, the UE can divide the soft buffer into less partitions for arranging less HARQ processes with a large size in the partitions, to improve coding performance of the HARQ processes. That is, the soft buffer is utilized efficiently and flexibly. As a result, a better tradeoff between the blocking probabilities and the coding performance can be achieved. Therefore, system throughput is increased, and the UE can operate regularly without an interrupt or a delay.

Please note that, a spirit of the process 100 is that the UE divides one or more sub-blocks of the soft buffer into various numbers of partitions, to arrange (e.g. stores) the plurality of HARQ processes of the plurality of CCs in the partitions such that the soft buffer is utilized efficiently and flexibly. Factors according to which the UE determines a number of partitions are not limited. Methods based on which the UE divides the soft buffer and arranges the HARQ processes are also not limited.

Figure 11:
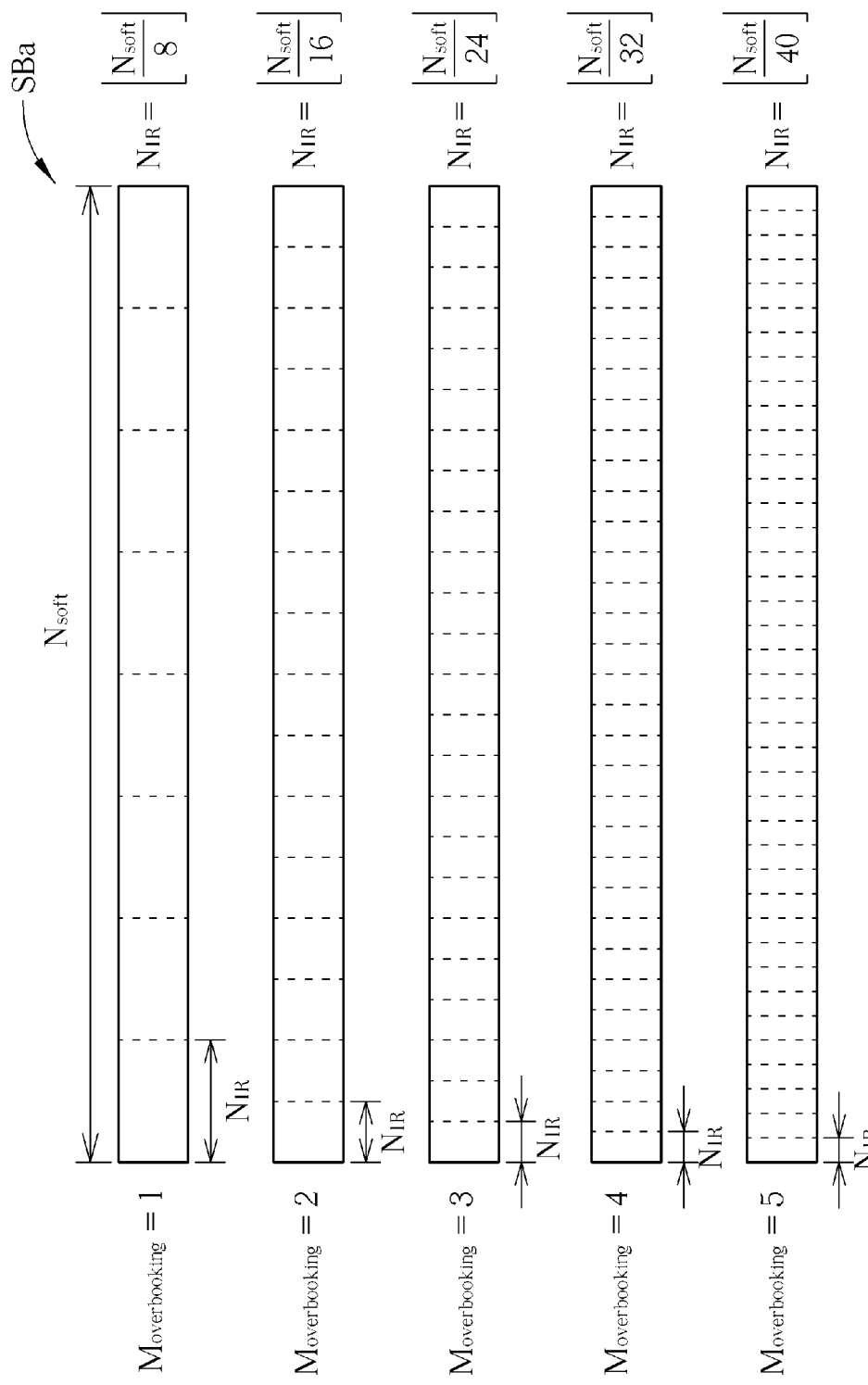
FIG. 11 is a schematic diagram of a soft buffer according to an example of the present invention.

For example, a soft buffer of a UE can be directly divided into more partitions such that more HARQ processes can be stored in the soft buffer. In other words, the soft buffer is not divided into multiple sub-blocks, i.e., the soft buffer is divided into only one sub-block. Please refer to FIG. 11, which is a schematic diagram of a soft buffer SBa according an example of the present invention. The soft buffer SBa can be divided into various numbers of partitions as shown in FIG. 11. A number of CCs configured to the UE is not limited. In detail, the soft buffer SBa with a size $N_{soft}$ is divided into multiple partitions wherein a size of each partition is $N_{IR}$, according to the following equations:

$$N_{IR} = \left\lfloor \frac{N_{soft}}{K_{MIMO} \cdot M_{overbooking} \cdot \min(M'_{DL\_HARQ}, M_{limit})} \right\rfloor, \quad \text{(Eq. 5)}$$

wherein $K_{MIMO}$ a number of transport blocks that may be transmitted to the UE in one TTI per CC, and is related to the MIMO used by the UE and the network.

In general, if spatial multiplexing with n spatial streams is configured to the UE, $K_{MIMO}$ is set to n. $M_{overbooking}$ is a weighting comprised in the indication for controlling a number of the partitions, and is a positive value. $M_{limit}$ is a positive value, e.g. $M_{limit}=8$. $M'_{DL\_HARQ}$ is the maximum number of DL HARQ processes per serving cell if the configured CCs are configured the same duplex mode and configurations. On the other hand, if the UE operates in a TDD mode, $M'_{DL\_HARQ}$ is the maximum number of DL HARQ processes of the PCC if at least one configured SCC are configured with different UL-DL configurations. Thus, when the UE operates in a FDD mode and does not support spatial multiplexing, the soft buffer SBa is divided into $8 \cdot M_{overbooking}$ partitions, wherein sizes of the partitions are the same when using a fixed $M_{overbooking}$. That is, when the weighting $M_{overbooking}$ is set to 1, 2, 3, 4 and 5, the soft buffer SBa is divided into 8, 16, 24, 32 and 40 partitions, respectively, if the spatial multiplexing is not supported by the UE. In this case, the size of each partition is set to $$N_{IR} = \left\lfloor \frac{N_{soft}}{8 \cdot M_{overbooking}} \right\rfloor.$$

As shown in FIG. 11, the DL HARQ processes of all the CCs share all the partitions in the soft buffer SBa for a fixed $M_{overbooking}$. That is, sizes of partitions used for a PCC and a SCC are the same (i.e., $N_{IR}$). A tradeoff between blocking probabilities and coding performance of the DL HARQ processes can be made when determining the weighting $M_{overbooking}$. That is, more partitions result lower blocking probabilities at cost of worse coding performance, and less partitions result better coding performance at cost of higher blocking probabilities.

Please note that, an indication (and thus the weighting $M_{overbooking}$) can be generated according to various factors, such as design considerations or system requirements. For example, the weighting $M_{overbooking}$ can be determined according to a combination of priorities of CCs configured to the UE, UE category of the UE, a number of NACKs transmitted by the UE, an average number of HARQ processes of the UE, traffic load of the UE, a number of the CCs configured to the UE, bandwidths of the CCs configured to the UE and a maximum number of layers supported by the UE, and is not limited herein. That is, the indication (and thus the weighting $M_{overbooking}$) is generated (e.g. by the UE or the network) according to the combination of the abovementioned parameters and variables. Please refer to FIG. 12A, which is a table 120 of the weightings $M_{overbooking}$ relating to the number of the CCs according to an example of the present invention, and $f_i$, $1 \le i \le 5$, are positive values. As shown in the table 120, the weighting $M_{overbooking}$ is determined according to the number of the CCs. For example, if 4 CCs are configured to the UE, the weighting $M_{overbooking}$ is set to $f_4$. On the other hand, the weighting $M_{overbooking}$ can also be determined according to both the UE category of the UE and the number of the CCs. Please refer to FIG. 12B, which is a table 122 of the weightings $M_{overbooking}$ relating to the UE category and the number of the CCs according to an example of the present invention, and $f_{i,j}$, $1 \le i \le 8$, $1 \le j \le 5$ are positive values. For example, if the UE category is 5 and 3 CCs are configured to the UE, the weighting $M_{overbooking}$ is set to $f_{5,3}$. Furthermore, the weighting $M_{overbooking}$ can be determined according to both the UE category of the UE and the maximum number of layers supported by the UE. Please refer to FIG. 12C, which is a table 124 of the weightings $M_{overbooking}$ relating to the UE category and the maximum number of layers supported by the UE according to an example of the present invention, and $f_{i,j}$, $1 \le i \le 8$, $1 \le j \le 8$ are positive values. For example, if the UE category is 7 and the maximum number of layers supported by the UE is 4, the weighting $M_{overbooking}$ is set to $f_{7,4}$.

Figure 13:
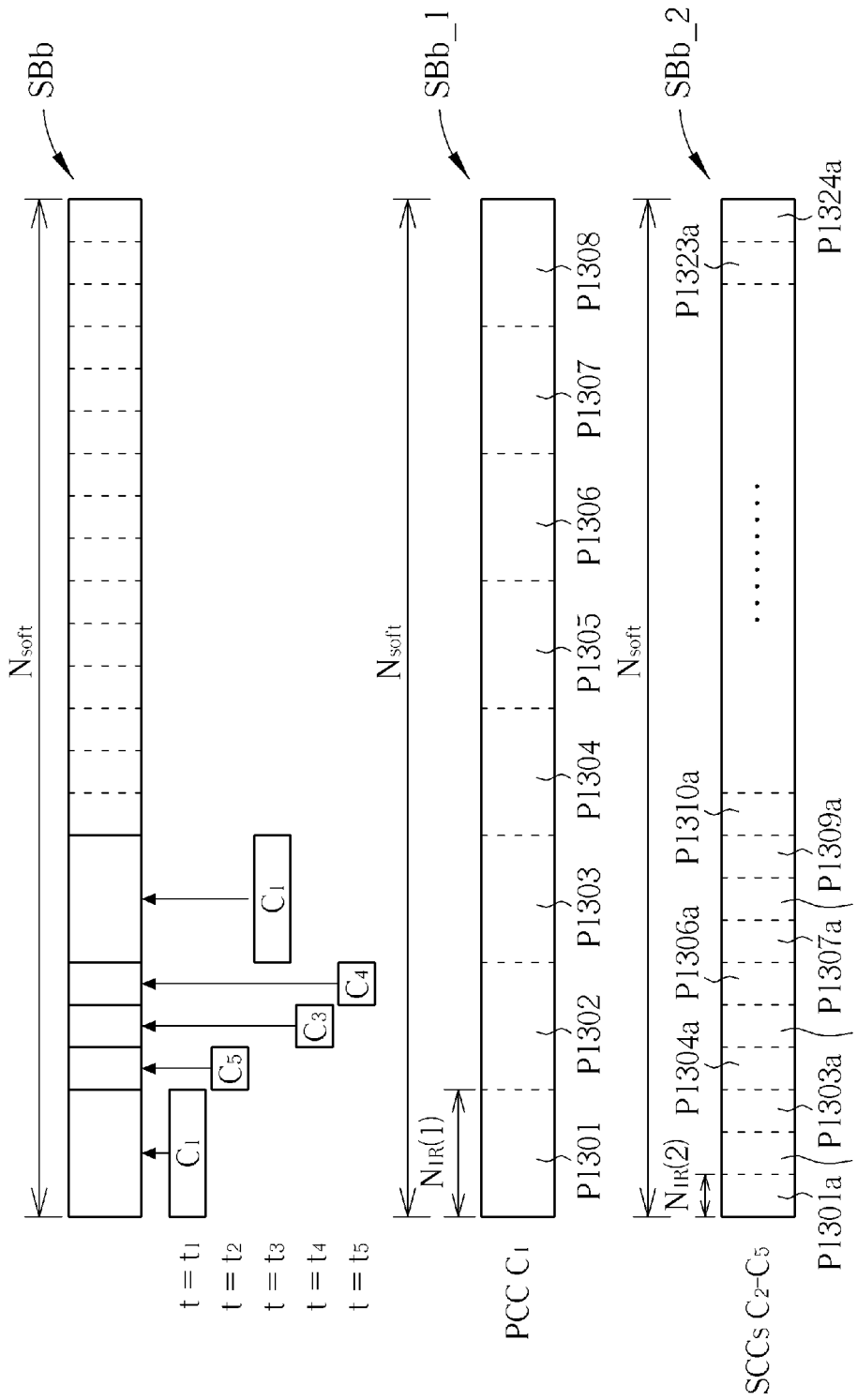
FIG. 13 is a schematic diagram of a soft buffer according to an example of the present invention.

In the abovementioned examples, the present invention is applied to all CCs configured to a UE. However, the present invention can also be applied to a subset of the CCs configured to the UE. Please refer to FIG. 13, which is a schematic diagram of a soft buffer SBb according an example of the present invention. In the present example, 5 CCs including a PCC $C_1$ and SCCs $C_2$-$C_5$ are configured to a UE. In detail, a weighting $M_{overbooking}$ corresponding to the PCC $C_1$ is set to 1, and weightings $M_{overbooking}$ corresponding to the SCCs $C_2$-$C_5$ are set to 3. That is, 8 partitions P1301-P1308 which are unchanged are seen by the PCC $C_1$ as shown by a soft buffer SBb_1 in FIG. 13, wherein a size of each partition is $N_{IR}(1)$. Besides, 24 partitions P1301a-P1324a are seen by the SCCs $C_2$-$C_5$ as shown by a soft buffer SBb_2 in FIG. 13, wherein a size of each partition is $N_{IR}(2)$, i.e., $N_{IR}(1)=3N_{IR}(2)$. Then, HARQ processes of the PCC $C_1$ and the SCCs $C_2$-$C_5$ can be arranged in the soft buffer SBb according to the corresponding partitions shown by the soft buffers SBb_1 and SBb_2. An example of arranging the HARQ processes of the CCs is illustrated as follows. At time t1, the UE needs to arrange (e.g. store) a HARQ process of the PCC $C_1$. Since the soft buffer SBb is empty, the UE arranges the HARQ process of the PCC $C_1$ in the partition P1301 (i.e., the partitions P1301a-P1303a). At time t2, the UE needs to arrange a HARQ process of the SCC $C_5$, and the UE continues to arrange the HARQ process of the SCC $C_5$ in the partition P1304a. At time t3, the UE needs to arrange another HARQ process of the PCC $C_1$ again. Since the size of the partition seen by the PCC C1 is $N_{IR}(1)$ as shown by the soft buffer SBb_1, the UE arrange the another HARQ process of the PCC $C_1$ in the partition P1303 (i.e., the partitions P1307a-P1309a). Further, the UE needs to arrange HARQ processes of the SCC $C_3$ and the SCC $C_4$ at times t4 and t5, respectively. The UE arranges the HARQ processes of the SCC $C_3$ and the SCC $C_4$ in the partitions P1305a and P1306a, respectively. Therefore, except low blocking probability and better coding performance, the present invention further utilizes the soft buffer flexibly by dividing the soft buffer into smaller partitions for only part of CCs configured to the UE.

Figure 14:
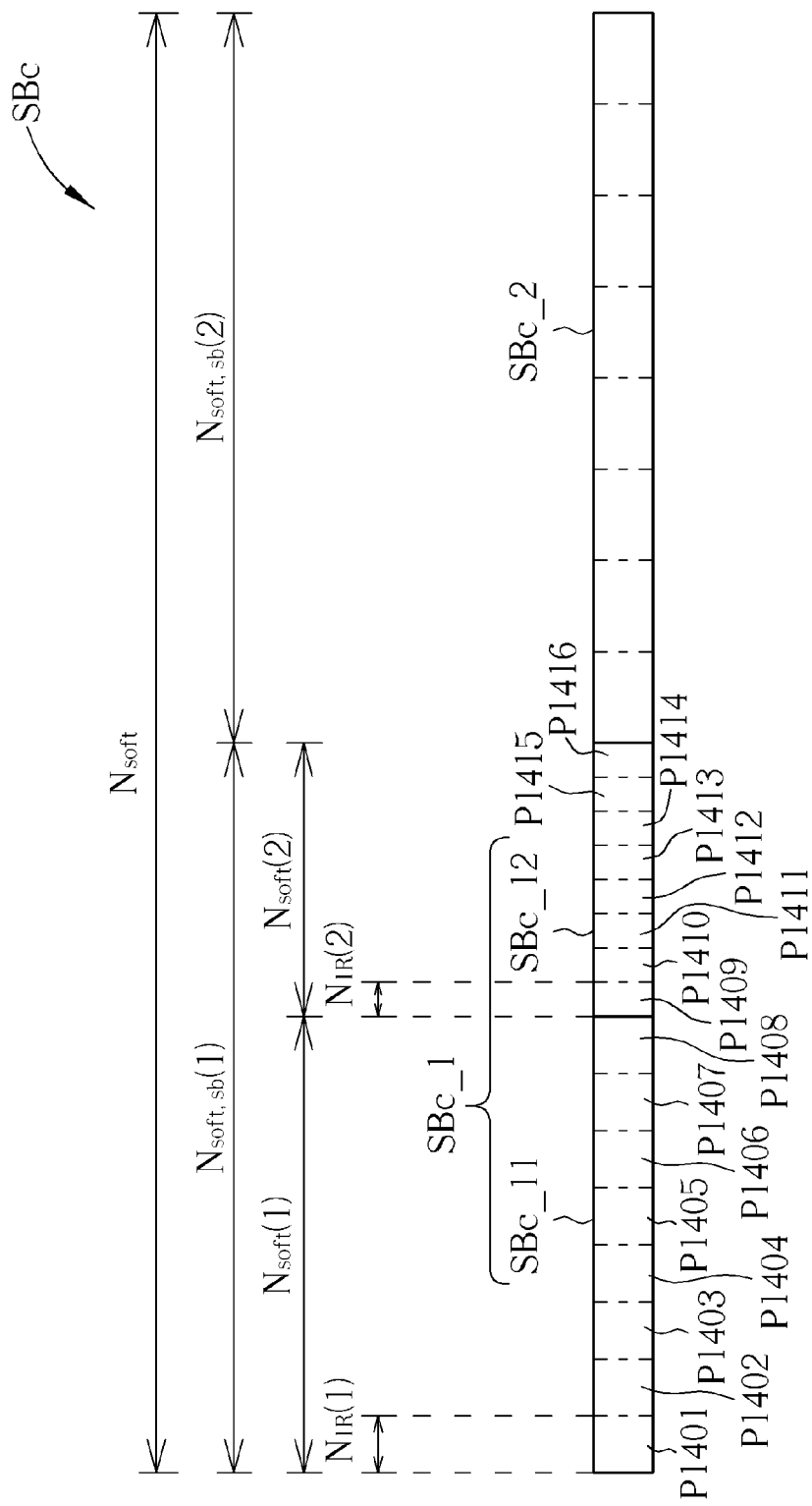
FIG. 14 is a schematic diagram of a soft buffer according to an example of the present invention.

On the other hand, the present invention can also be applied to part of a soft buffer of a UE. That is, only the part of the soft buffer is divided into partitions with various sizes and amounts according to weightings, and the other part of the soft buffer is divided into 8 partitions according to the prior art. For example, please refer to FIG. 14, which is a schematic diagram of a soft buffer SBc according to an example of the present invention. The soft buffer SBc is used for HARQ processes of CCs $C_1$-$C_5$, and is first divided into two sub-blocks SBc_1 and SBc_2. The sub-block SBc_1 is used for the CCs $C_1$ and $C_2$, and the sub-block SBc_2 is used for the CCs $C_3$-$C_5$. Sizes of the sub-blocks SBc_1 and SBc_2 which are $N_{soft,sb}(1)$ and $N_{soft,sb}(2)$, respectively, can be determined according to different design considerations or system requirements (e.g. the indication), and is not limited. Then, the sub-block SBc_1 is further divided into various number of partitions. In other words, methods based on which the sub-block SBc_1 is further divided are not limited. Realizations and methods which have been illustrated above can be directly applied. For example, the method illustrated by FIG. 8 can be applied to the sub-block SBc_1 as shown in FIG. 14 by replacing $N_{soft}$ in FIG. 8 with $N_{soft,sb}(1)$ in FIG. 14. Similarly, the sub-block SBc_1 is further divided into two sub-blocks SBc_11 and SBc_12 with sizes of $N_{soft}(1)$ and $N_{soft}(2)$, respectively. The sub-blocks SBc_11 and SBc_12 are divided into partitions P1401-P14016, wherein a size of each of the partitions P1401-1408 is $N_{IR}(1)$, and a size of each of the partitions P1409-1416 is $N_{IR}(2)$. The sub-block SBc_2 is divided into 8 partitions according to the prior art, and is not narrated herein for simplicity. In short, those skilled in the art should readily make combinations, modifications or alterations on the process 70, the process 100 and examples mentioned above. Therefore, except low blocking probability and better coding performance, the present invention further utilizes the soft buffer flexibly by dividing only part of the soft buffer into smaller partitions.

Besides, the indication (and hence the weighting) mentioned above can be generated by the UE itself. Alternatively, the indication is generated by a network, and is transmitted by the network to the UE via a signaling (e.g. radio resource control (RRC) signaling). Furthermore, the indication can be generated by both the UE and the network according to the same rule, to reducing overhead of the signaling. On the other hand, a time at which a soft buffer is divided into multiple partitions for multiple CCs is not limited. For example, the soft buffer can be divided after a PCC of the CCs is reconfigured, i.e., an indication capable of determining the weightings is generated after the PCC is reconfigured. Alternatively, the soft buffer can be divided after a number of the CCs is changed, i.e., an indication capable of determining the weightings is generated after the number of the CCs is changed. Further, the CCs mentioned in the above examples are preferably referred to as DL CCs, since HARQ processes stored in the UE are corresponding to packets transmitted on DL.

Besides, the process 100 and examples mentioned above can also be realized in the network. For example, the network can determine a number of partitions according to an indication, and transmit information (e.g. the number) of the partitions to a UE such that the UE can divide the soft buffer into the partitions according to the information. Besides, the network may not need to transmit the information to the UE since the same indication is also generated by the UE according to the same rule. Thus, the UE can determine the number and divide the soft buffer into the sub-blocks according to the number.

Please note that, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides methods for handling a soft buffer of a UE configured with multiple CCs in a wireless communication system. Blocking probabilities of HARQ processes of the CCs are reduced. Further, data transmitted on a PCC can be recovered and executed rapidly. Therefore, system throughput is increased, and the UE can operate regularly without an interrupt or a delay.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a soft buffer of a mobile device in a wireless communication system, the mobile device being configured a plurality of component carriers (CCs) by a network of the wireless communication system, the method being utilized in the mobile device and comprising:
dividing at least one sub-block of the soft buffer into a plurality of partitions, wherein a number of the plurality of partitions is determined according to an indication; and
arranging a plurality of hybrid automatic repeat request (HARQ) processes of the plurality of CCs in the plurality of partitions;
one of the at least one sub-block is divided according to the following equation:

$$N_{IR} = \left\lfloor \frac{N_{soft}}{K_{MIMO} \cdot M_{overbooking} \cdot \min(M_{DL\_HARQ}, M_{limit})} \right\rfloor,$$

wherein $N_{soft}$ is a size of the one of the at least one sub-block; $N_{IR}$ is a size of each of the plurality of partitions; $K_{MIMO}$ is related to a multiple-input multiple-output (MIMO) used by the mobile device and the network; $M_{overbooking}$ is a weighting comprised in the indication for controlling the number of the plurality of partitions, is related to a user equipment (UE) category of the mobile device, and is a positive value; $M_{limit}$ is a positive value; $M_{DL\_HARQ}$ is the maximum number of HARQ processes of a plurality of downlink CCs; min(x,y) returns the smaller one of x and y; and $\lfloor x \rfloor$ returns the largest integer not greater than x.

2. The method of claim 1, wherein the indication is generated according to a combination of a plurality of priorities of the plurality of CCs, user equipment (UE) category of the mobile device, a number of negative acknowledgments (NACKs) of the mobile device, an average number of HARQ processes of the mobile device, traffic load of the mobile device, a number of the plurality of CCs, bandwidths of the plurality of CCs and a maximum number of layers supported by the mobile device.

3. The method of claim 1, wherein the indication is generated by the mobile device.

4. The method of claim 1, wherein the indication is generated by the mobile device and the network according to the same rule.

5. The method of claim 1, wherein the indication is generated by the network, and is transmitted by the network to the mobile device via a signaling.

6. The method of claim 1, wherein the mobile device divides the at least one sub-block of the soft buffer into the plurality of partitions by:
dividing the at least one sub-block of the soft buffer into the plurality of partitions, wherein the number of the plurality of partitions is determined according to the indication, after a primary CC (PCC) of the plurality of CCs is reconfigured.

7. The method of claim 1, wherein the mobile device divides the at least one sub-block of the soft buffer into the plurality of partitions by:
dividing the at least one sub-block of the soft buffer into the plurality of partitions, wherein the number of the plurality of partitions is determined according to the indication, after a number of the plurality of CCs is changed.

8. The method of claim 1, wherein the plurality of CCs are total CCs configured to the mobile device or are part of the CCs configured to the mobile device.

9. The method of claim 1, wherein the soft buffer is total soft buffer of the mobile device or is part of the total soft buffer of the mobile device.

10. The method of claim 1, wherein the plurality of CCs are downlink (DL) CCs.

11. The method of claim 1, further comprising:
dividing the soft buffer into the at least one sub-block according to the indication.

12. The method of claim 1, wherein a number of the at least one sub-block is one, and dividing the at least one sub-block of the soft buffer into the plurality of partitions, wherein the number of the plurality of partitions is determined according to the indication comprises:
dividing the soft buffer into the plurality of partitions, wherein the number of the plurality of partitions is determined according to the indication.

13. A method of handling a soft buffer of a mobile device in a wireless communication system for a network of the wireless communication system, the mobile device being configured a plurality of component carriers (CCs) by the network, the method being utilized in the network and comprising:
determining a number of a plurality of partitions according to an indication; and
dividing at least one sub-block of the soft buffer into the plurality of partitions according to the number of the plurality of partitions;
one of the at least one sub-block is divided according to the following equation:

$$N_{IR} = \left\lfloor \frac{N_{soft}}{K_{MIMO} \cdot M_{overbooking} \cdot \min(M_{DL\_HARQ}, M_{limit})} \right\rfloor,$$

wherein $N_{soft}$ is a size of the one of the at least one sub-block; $N_{IR}$ is a size of each of the plurality of partitions; $K_{MIMO}$ is related to a multiple-input multiple-output (MIMO) used by the mobile device and the network; $M_{overbooking}$ is a weighting comprised in the indication for controlling the number of the plurality of partitions, is related to a user equipment (UE) category of the mobile device, and is a positive value; $M_{limit}$ is a positive value; $M_{DL\_HARQ}$ is the maximum number of HARQ processes of a plurality of downlink CCs; min(x,y) returns the smaller one of x and y; and $\lfloor x \rfloor$ returns the largest integer not greater than x.

14. The method of claim 13, further comprising:
transmitting information of the plurality of partitions to the mobile device, for the mobile device to arrange a plurality of hybrid automatic repeat request (HARQ) processes of the plurality of CCs in the plurality of partitions.

15. The method of claim 13, wherein the indication is generated according to a combination of a plurality of priorities of the plurality of CCs, user equipment (UE) category of the mobile device, a number of negative acknowledgments (NACKs) of the mobile device, an average number of HARQ processes of the mobile device, traffic load of the mobile device, a number of the plurality of CCs, bandwidths of the plurality of CCs and a maximum number of layers supported by the mobile device.

16. The method of claim 13, wherein the indication is generated by the mobile device and the network according to the same rule.

17. The method of claim 16, wherein the mobile device determines the number of the plurality of partitions according to the indication, and divides the at least one sub-block of the soft buffer into the plurality of partitions according to the number of the plurality of partitions.

18. The method of claim 13, wherein the network divides the at least one sub-block of the soft buffer into the plurality of partitions by:
dividing the at least one sub-block of the soft buffer into the plurality of partitions, wherein the number of the plurality of partitions is determined according to the indication, after a primary CC (PCC) of the plurality of CCs is reconfigured.

19. The method of claim 13, wherein the network divides the at least one sub-block of the soft buffer into the plurality of partitions by:
dividing the at least one sub-block of the soft buffer into the plurality of partitions, wherein the number of the plurality of partitions is determined according to the indication, after a number of the plurality of CCs is changed.

20. The method of claim 13, wherein the plurality of CCs are total CCs configured to the mobile device or are part of the CCs configured to the mobile device.

21. The method of claim 13, wherein the soft buffer is total soft buffer of the mobile device or is part of the total soft buffer of the mobile device.

22. The method of claim 13, wherein the plurality of CCs are downlink (DL) CCs.

23. The method of claim 13, further comprising:
dividing the soft buffer into the at least one sub-block according to the indication.

24. The method of claim 13, wherein a number of the at least one sub-block is one, and the network divides the at least one sub-block of the soft buffer into the plurality of partitions by:
dividing the soft buffer into the plurality of partitions, wherein the number of the plurality of partitions is determined according to the indication.

25. A mobile device of a wireless communication system for handling a soft buffer of the mobile device, the mobile device being configured a plurality of component carriers (CCs) by a network of the wireless communication system, the mobile device comprising:
means for dividing at least one sub-block of the soft buffer into a plurality of partitions, wherein a number of the plurality of partitions is determined according to an indication; and
means for arranging a plurality of hybrid automatic repeat request (HARQ) processes of the plurality of CCs in the plurality of partitions;
one of the at least one sub-block is divided according to the following equation:

$$N_{IR} = \left\lfloor \frac{N_{soft}}{K_{MIMO} \cdot M_{overbooking} \cdot \min(M_{DL\_HARQ}, M_{limit})} \right\rfloor,$$

wherein $N_{soft}$ is a size of the one of the at least one sub-block; $N_{IR}$ is a size of each of the plurality of partitions; $K_{MIMO}$ is related to a multiple-input multiple-output (MIMO) used by the mobile device and the network; $M_{overbooking}$ is a weighting comprised in the indication for controlling the number of the plurality of partitions, is related to a user equipment (UE) category of the mobile device, and is a positive value; $M_{limit}$ is a positive value; $M_{DL\_HARQ}$ is the maximum number of HARQ processes of a plurality of downlink CCs; min(x,y) returns the smaller one of x and y; and $\lfloor x \rfloor$ returns the largest integer not greater than x.

26. The mobile device of claim 25, wherein the indication is generated according to a combination of a plurality of priorities of the plurality of CCs, user equipment (UE) category of the mobile device, a number of negative acknowledgments (NACKs) of the mobile device, an average number of HARQ processes of the mobile device, traffic load of the mobile device, a number of the plurality of CCs, bandwidths of the plurality of CCs and a maximum number of layers supported by the mobile device.

27. The mobile device of claim 25, wherein the indication is generated by the mobile device.

28. The mobile device of claim 25, wherein the indication is generated by the mobile device and the network according to the same rule.

29. The mobile device of claim 25, wherein the indication is generated by the network, and is transmitted by the network to the mobile device via a signaling.

30. The mobile device of claim 25, wherein the means for dividing the at least one sub-block of the soft buffer into the plurality of partitions divides the at least one sub-block by:
dividing the at least one sub-block of the soft buffer into the plurality of partitions, wherein the number of the plurality of partitions is determined according to the indication, after a primary CC (PCC) of the plurality of CCs is reconfigured.

31. The mobile device of claim 25, wherein the means for dividing the at least one sub-block of the soft buffer into the plurality of partitions divides the at least one sub-block by:
dividing the at least one sub-block of the soft buffer into the plurality of partitions, wherein the number of the plurality of partitions is determined according to the indication, after a number of the plurality of CCs is changed.

32. The mobile device of claim 25, wherein the plurality of CCs are total CCs configured to the mobile device or are part of the CCs configured to the mobile device.

33. The mobile device of claim 25, wherein the soft buffer is total soft buffer of the mobile device or is part of the total soft buffer of the mobile device.

34. The mobile device of claim 25, wherein the plurality of CCs are downlink (DL) CCs.

35. The mobile device of claim 25, further comprising:
means for dividing the soft buffer into the at least one sub-block according to the indication.

36. The mobile device of claim 25, wherein a number of the at least one sub-block is one, and the means for dividing the at least one sub-block of the soft buffer into the plurality of partitions divides the at least one sub-block by:
dividing the soft buffer into the plurality of partitions, wherein the number of the plurality of partitions is determined according to the indication.

37. A network of a wireless communication system for handling a soft buffer of a mobile device in the wireless communication system, the mobile device being configured a plurality of component carriers (CCs) by the network, the network comprising:
means for determining a number of a plurality of partitions according to an indication; and
means for dividing at least one sub-block of the soft buffer into the plurality of partitions according to the number of the plurality of partitions;
one of the at least one sub-block is divided according to the following equation:

$$N_{IR} = \left\lfloor \frac{N_{soft}}{K_{MIMO} \cdot M_{overbooking} \cdot \min(M_{DL\_HARQ}, M_{limit})} \right\rfloor,$$

wherein $N_{soft}$ is a size of the one of the at least one sub-block; $N_{IR}$ is a size of each of the plurality of partitions; $K_{MIMO}$ is related to a multiple-input multiple-output (MIMO) used by the mobile device and the network; $M_{overbooking}$ is a weighting comprised in the indication for controlling the number of the plurality of partitions, is related to a user equipment (UE) category of the mobile device, and is a positive value; $M_{limit}$ is a positive value; $M_{DL\_HARQ}$ is the maximum number of HARQ processes of a plurality of downlink CCs; min(x,y) returns the smaller one of x and y; and $\lfloor x \rfloor$ returns the largest integer not greater than x.

38. The network of claim 37, further comprising:
means for transmitting information of the plurality of partitions to the mobile device, for the mobile device to arrange a plurality of hybrid automatic repeat request (HARQ) processes of the plurality of CCs in the plurality of partitions.

39. The network of claim 37, wherein the indication is generated according to a combination of a plurality of priorities of the plurality of CCs, user equipment (UE) category of the mobile device, a number of negative acknowledgments (NACKs) of the mobile device, an average number of HARQ processes of the mobile device, traffic load of the mobile device, a number of the plurality of CCs, bandwidths of the plurality of CCs and a maximum number of layers supported by the mobile device.

40. The network of claim 37, wherein the indication is generated by the mobile device and the network according to the same rule.

41. The network of claim 40, wherein the mobile device determines the number of the plurality of partitions according to the indication, and divides the at least one sub-block of the soft buffer into the plurality of partitions according to the number of the plurality of partitions.

42. The network of claim 37, wherein the means for dividing the at least one sub-block of the soft buffer into the plurality of partitions divides the at least one sub-block by:
dividing the at least one sub-block of the soft buffer into the plurality of partitions, wherein the number of the plurality of partitions is determined according to the indication, after a primary CC (PCC) of the plurality of CCs is reconfigured.

43. The network of claim 37, wherein the means for dividing the at least one sub-block of the soft buffer into the plurality of partitions, divides the at least one sub-block by:
dividing the at least one sub-block of the soft buffer into the plurality of partitions, wherein the number of the plurality of partitions is determined according to the indication, after a number of the plurality of CCs is changed.

44. The network of claim 37, wherein the plurality of CCs are total CCs configured to the mobile device or are part of the CCs configured to the mobile device.

45. The network of claim 37, wherein the soft buffer is total soft buffer of the mobile device or is part of the total soft buffer of the mobile device.

46. The network of claim 37, wherein the plurality of CCs are downlink (DL) CCs.

47. The network of claim 37, further comprising:
means for dividing the soft buffer into the at least one sub-block according to the indication.

48. The network of claim 37, wherein a number of the at least one sub-block is one divides the at least one sub-block by:
dividing the soft buffer into the plurality of partitions, wherein the number of the plurality of partitions is determined according to the indication.

* * * * *